(12) United States Patent
Gambetta et al.

(10) Patent No.: US 11,074,104 B2
(45) Date of Patent: Jul. 27, 2021

(54) QUANTUM ADAPTIVE CIRCUIT DISPATCHER

(71) Applicant: International Business Machines Corporation, Armonk, NY (US)

(72) Inventors: Jay M. Gambetta, Yorktown Heights, NY (US); Ismael Faro Sertage, Chappaqua, NY (US); Andrew Wack, Millbrook, NY (US); Francisco Jose Martin Fernandez, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

(21) Appl. No.: 16/378,833

(22) Filed: Apr. 9, 2019

(65) Prior Publication Data
US 2020/0326977 A1    Oct. 15, 2020

(51) Int. Cl.
*G06F 9/44* (2018.01)
*G06F 9/48* (2006.01)
*G06F 9/50* (2006.01)
*G06N 10/00* (2019.01)
*G06F 9/54* (2006.01)

(52) U.S. Cl.
CPC .......... *G06F 9/4881* (2013.01); *G06F 9/5027* (2013.01); *G06F 9/541* (2013.01); *G06N 10/00* (2019.01); *G06F 2209/548* (2013.01)

(58) Field of Classification Search
CPC ...... G06F 9/4881; G06F 9/5027; G06F 9/541; G06F 2209/548; G06N 10/00
See application file for complete search history.

(56) References Cited

U.S. PATENT DOCUMENTS

| 6,211,810 | B1 * | 4/2001 | Schirf | G01S 7/295 |
| | | | | 342/108 |
| 7,249,357 | B2 | 7/2007 | Landman et al. | |
| 8,832,165 | B2 | 9/2014 | Allen et al. | |

(Continued)

FOREIGN PATENT DOCUMENTS

EP    2477112 A1    7/2012

OTHER PUBLICATIONS

Mell, Peter, et al., "The NIST Definition of Cloud Computing." National Institute of Standards and Technology. Sep. 2011. 7 pages.

(Continued)

*Primary Examiner* — Jae U Jeon
(74) *Attorney, Agent, or Firm* — Amin, Turocy & Watson, LLP

(57) ABSTRACT

Techniques regarding the dispatchment of adapted quantum computer programs are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a dispatch component that can adapt a quantum circuit of a quantum computer program comprised within a queue based on a parameter of a quantum computer that is assigned to execute the quantum computer program.

18 Claims, 12 Drawing Sheets

(56) References Cited

U.S. PATENT DOCUMENTS

| | | | |
|---|---|---|---|
| 9,858,531 B1* | 1/2018 | Monroe | G06N 10/00 |
| 2007/0088871 A1 | 4/2007 | Kwong et al. | |
| 2010/0070780 A1* | 3/2010 | Murao | H04L 9/0852 |
| | | | 713/190 |
| 2017/0223094 A1 | 8/2017 | Johnson et al. | |
| 2017/0228483 A1* | 8/2017 | Rigetti | G06N 7/04 |
| 2017/0272174 A1* | 9/2017 | Brandenburger | H04B 10/70 |
| 2017/0308803 A1* | 10/2017 | Wallman | G06N 10/00 |
| 2018/0365585 A1* | 12/2018 | Smith | G06F 9/546 |
| 2020/0026551 A1* | 1/2020 | Ducore | G06F 11/3003 |
| 2020/0184023 A1* | 6/2020 | Delaney | G06N 5/003 |
| 2020/0272926 A1* | 8/2020 | Chaplin | G06F 30/30 |

OTHER PUBLICATIONS

Heckey, Jeff, et al. "Compiler Management of Communication and Parallelism for Quantum Computation." AACM, 2015. 12 pages. https://mrmgroup.cs.princeton.edu/papers/ASPLOS15.pdf.

* cited by examiner

QUANTUM ADAPTIVE CIRCUIT DISPATCHER

BACKGROUND

The subject disclosure relates to one or more dispatchers for queued quantum computer programs, and more specifically, one or more dispatch components that can adapt and/or assign quantum circuits of queued quantum computer programs to increase execution efficiency on available quantum computers.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate the assignment and/or adaptation of queued quantum computer programs are described.

According to an embodiment, a system is provided. The system can comprise a memory that can store computer executable components. The system can also comprise a processor, operably coupled to the memory, and that can execute the computer executable components stored in the memory. The computer executable components can comprise a dispatch component that can adapt a quantum circuit of a quantum computer program comprised within a queue based on a parameter of a quantum computer that is assigned to execute the quantum computer program.

According to an embodiment, a computer-implemented method is provided. The computer-implemented method can comprise adapting, by a system operatively coupled to a processor, a quantum circuit of a quantum computer program comprised within a queue based on a parameter of a quantum computer that is assigned to execute the quantum computer program.

According to an embodiment, a computer program product for managing execution of a quantum computer program is provided. The computer program product can comprise a computer readable storage medium having program instructions embodied therewith. The program instructions can be executable by a processor to cause the processor to adapt, by a system operatively coupled to the processor, a quantum circuit of the quantum computer program comprised within a queue based on a parameter of a quantum computer that is assigned to execute the quantum computer program.

DETAILED DESCRIPTION

Figure 1:
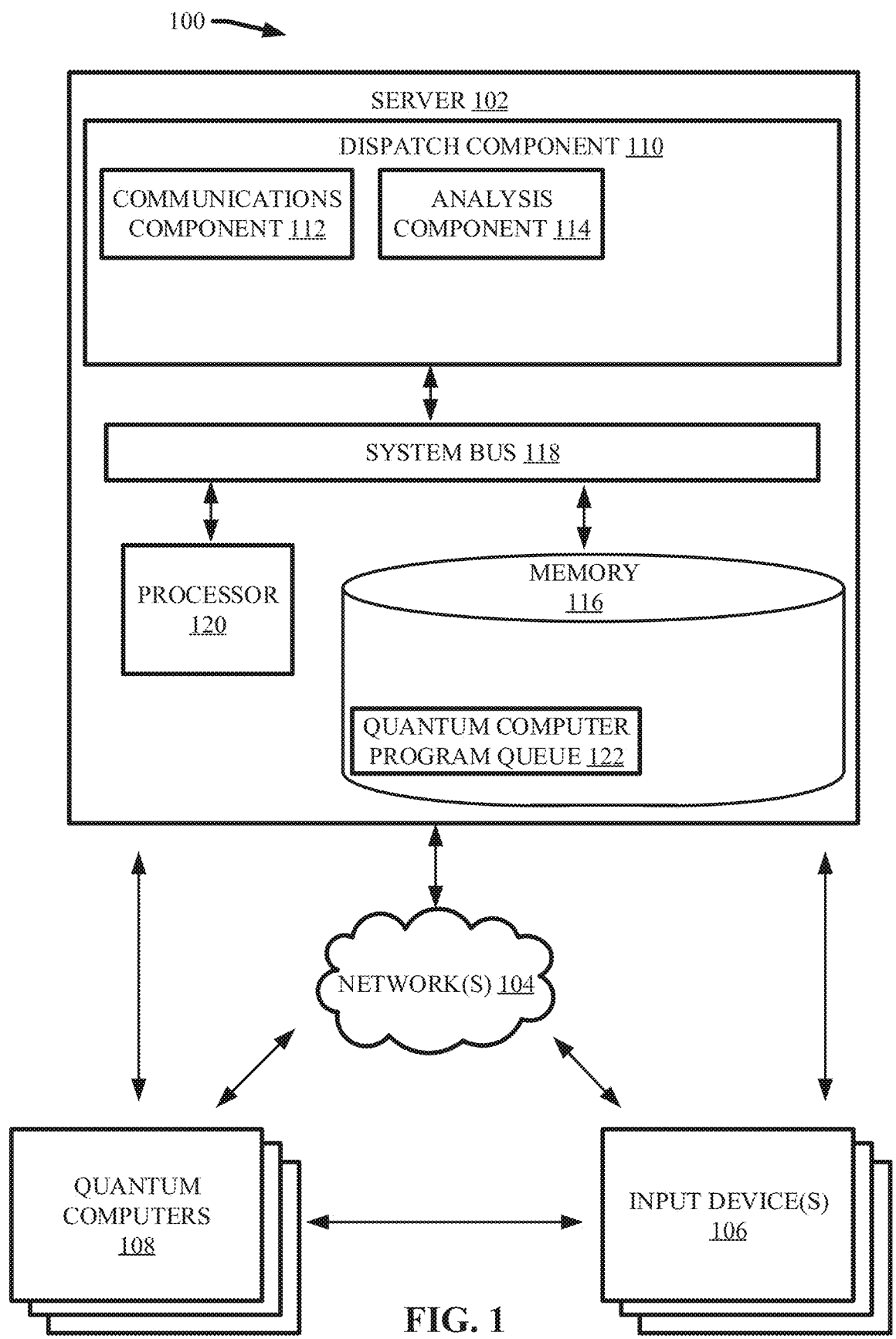
FIG. 1 illustrates a block diagram of an example, non-limiting system that can facilitate dispatching one or more adapted quantum computer programs to one or more quantum computers in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computer programming is the process of assembling sequences of instructions, called quantum computer programs, that can be capable of running on a quantum computer. Each quantum computer program can comprise a collection of quantum circuits that can delineate a connectivity scheme regarding one or more qubits. While more and more quantum computer programs are being created by numerous developers around the word, the number of quantum computers that can execute the quantum computer programs remains limited. Therefore, there is often more requests to run quantum computer programs than there are quantum computers to execute the requests; thereby resulting in a quantum computer program queue in communication with the existing quantum computers. Quantum computer programs waiting in the queue can be dispatched to quantum computers for execution as the quantum computers become available (e.g., finish executing another quantum computer program). However, performance requirements of the quantum computer programs and operation constraints of the quantum computers can impose restrictions on the dispatching and create inefficiencies in the execution time of the quantum computer programs.

Various embodiments of the present invention can be directed to computer processing systems, computer-implemented methods, apparatus and/or computer program products that can facilitate the efficient, effective, and autonomous (e.g., without direct human guidance) dispatching of quantum computer programs comprised within a queue based on one or more parameters of a quantum computer assigned to execute the quantum computer program. Further, one or more embodiments can comprise adapting one or more quantum circuits of the queued quantum computer programs based on the one or more parameters of the quantum computer. For example, the connectivity schemes of one or more quantum circuits can be modified in accordance with the qubit configuration of an available quantum computer to facilitate dispatching the quantum computer program to the quantum computer for execution. Adaptation of the one or more quantum computer programs and/or assignment to one or more quantum computers can be implemented to: reduce an average execution time of the one or more quantum computer programs, reduce an estimated error rate that characterizes execution of the one or more quantum computer programs, and/or balance a work load of the quantum computers in communication with the quantum computer program queue.

The computer processing systems, computer-implemented methods, apparatus and/or computer program products employ hardware and/or software to solve problems that are highly technical in nature (e.g., dispatching adapted quantum computer programs to quantum computers for execution), that are not abstract and cannot be performed as a set of mental acts by a human. An individual, or even a plurality of individuals, cannot readily analyze all the connectivity schemes of the multitude of quantum computer programs comprised within the quantum computer program que. The amount of time and resources spent in an attempt to manually perform the analyses and/or determinations described herein would be in direct contradiction to the numerous advantageous achieved by the autonomous nature of the various embodiments of the present invention.

FIG. 1 illustrates a block diagram of an example, non-limiting system 100 that can facilitate dispatching one or more quantum computer programs to one or more quantum computers in accordance with one or more embodiments described herein. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, one or more input devices 106, and/or one or more quantum computers 108. The server 102 can comprise dispatch component 110. The dispatch component 110 can further comprise communications component 112 and/or analysis component 114. Also, the server 102 can comprise or otherwise be associated with at least one memory 116. The server 102 can further comprise a system bus 118 that can couple to various components such as, but not limited to, the dispatch component 110 and associated components, memory 116 and/or a processor 120. While a server 102 is illustrated in FIG. 1, in other embodiments, multiple devices of various types can be associated with or comprise the features shown in FIG. 1. Further, the server 102 can communicate with one or more cloud computing environments via the one or more networks 104.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 and/or quantum computers 108 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the dispatch component 110 can be provided on the one or more servers 102, it should be appreciated that the architecture of system 100 is not so limited. For example, the dispatch component 110, or one or more components of dispatch component 110, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input data into the system 100, thereby sharing (e.g., via a direct connection and/or via the one or more networks 104) said data with the server 102 and/or quantum computers 108. For example, the one or more input devices 106 can send data to the communications component 112 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input one or more settings and/or commands into the system 100. For example, in the various embodiments described herein, a user of the system 100 can operate and/or manipulate the server 102 and/or associate components via the one or more input devices 106. Additionally, a user of the system 100 can utilize the one or more input devices 106 to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

The one or more quantum computers 108 can execute one or more quantum computer programs to make direct use of distinctively quantum mechanical phenomena, such as superposition and/or entanglement, to perform operations on data. The one or more quantum computers 108 can comprise quantum computers 108 characterized by respective parameters. Example parameters can include, but are not limited to: a quantum computer's 108 qubit configuration (e.g., including the number, connectivity, and/or properties of qubits comprised within the quantum computer 108), the construction type of a quantum computer 108 (e.g., whether a subject quantum computer is an adiabatic quantum computer, a cluster-state quantum computer, or a gate-based quantum computer), a quantum computer's 108 quantum gate configuration (e.g., including the number, type, position, and/or connectivity of quantum gates included in the subject quantum computer 108), a combination thereof, and/or the like. Example types of quantum computers 108 can include, but are not limited to: atom trap quantum computers, nuclear magnetic resonance quantum computers, photonic quantum computers, quantum dot quantum computers, and/or superconductor quantum computers.

In one or more embodiments, the communications component 112 can receive quantum computer programs from the one or more input devices 106 (e.g., via a direct electrical connection and/or through the one or more networks 104) and share the data with the various associate components of the dispatch component 110. For example, the communications component 112 can store received quantum computer programs (e.g., received from the one or more input devices 106) in one or more quantum computer program ques 122 stored in the one or more memories 116.

In one or more embodiments, the one or more quantum computer program ques 122 can be located in a cloud computing network, wherein the communications component 112 can retrieve (e.g., via the one or more networks 104) one or more quantum computer programs from the quantum computer program queue 122 for analysis by the dispatch component 110. For example, a user of the system 100 can enter one or more quantum computer programs directly into the quantum computer program queue 122 via the one or more input devices 106.

The quantum computer program queue 122 can comprise one or more quantum computer programs awaiting execution by one or more quantum computers 108. In one or more embodiments, the one or more quantum computer programs can be arranged within the quantum computer program queue 122 based on one or more properties. Example properties can include, but are not limited to: the order in which the quantum computer programs were stored in the quantum computer program queue 122 (e.g., quantum computer programs that have been stored for the longest period of time can be prioritized within the quantum computer program queue 122), the size of the quantum computer programs, the type of quantum computer programs, the function of the quantum computer programs, the origin of the quantum computer programs (e.g., the user credited with submitting the quantum computer program to the system 100), a combination thereof, and/or the like.

The analysis component 114 can analyze the characteristics of one or more quantum computer programs comprised within the one or more quantum computer program ques 122 to facilitate dispatchment of quantum computer programs to quantum computers 108 for execution. For example, the analysis component 114 can analyze the one or more quantum computer programs stored within the one or more quantum computer program ques 122 to derive one or more characteristics regarding the quantum computer programs. Example characteristics can include, but are not limited to: a connectivity scheme of the one or more quantum circuits comprised within the quantum computer programs (e.g., including the number and/or type of features comprised within the quantum circuits, such as qubits and/or quantum gates, and how the features are interconnected), an error rate that characterizes performance of the quantum computer program, a function of the quantum computer program, minimum system requirements for executing the quantum computer program, a combination thereof, and/or the like. For example, the analysis component 114 can read one or more configuration files (e.g., JSON files) associated with the subject quantum computer program. In one or more embodiments, the analysis component 114 can store the derived characteristics for each analyzed quantum computer program in the one or more memories 116 and/or the one or more quantum computer program ques 122.

Figure 2:
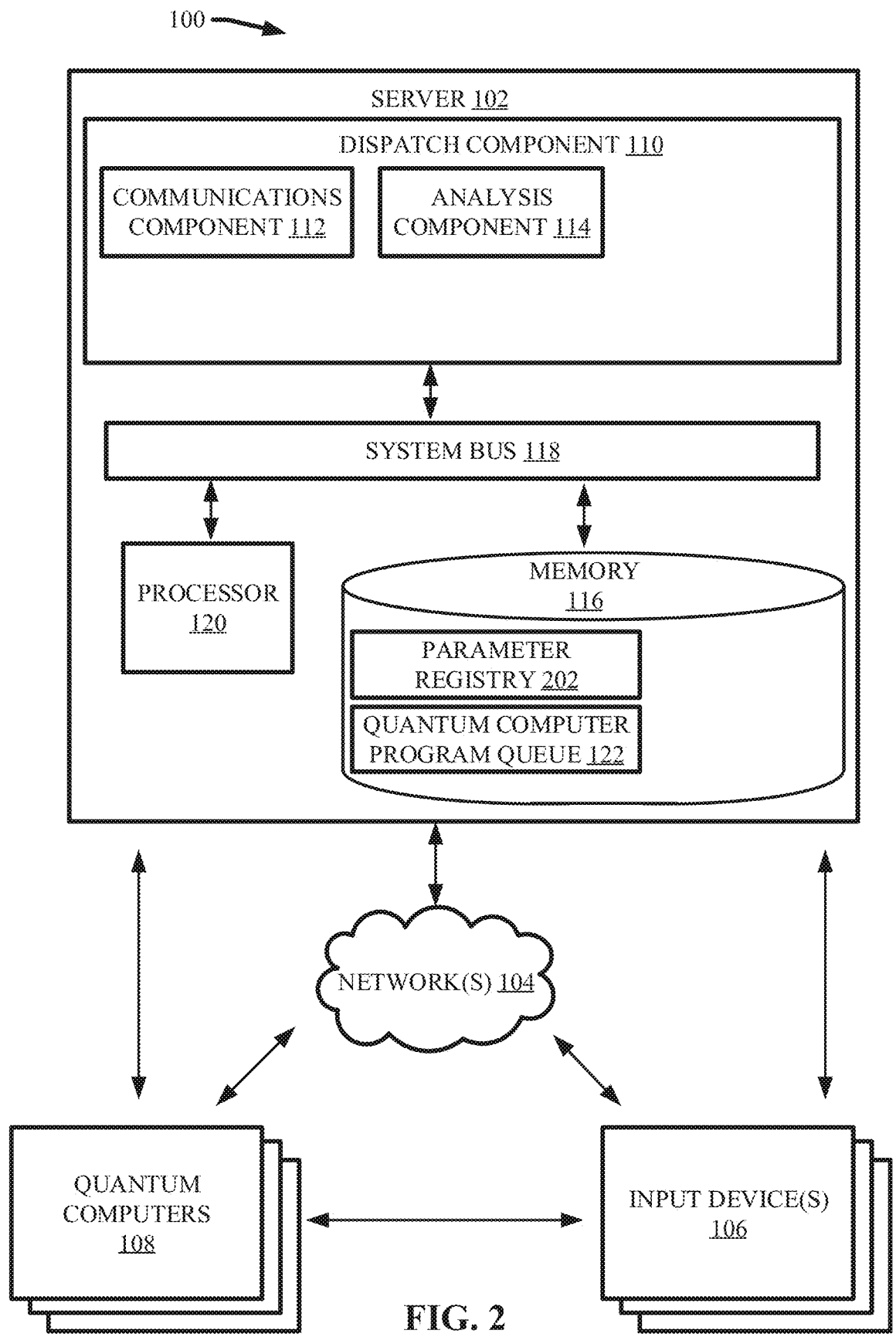
FIG. 2 illustrates a block diagram of an example, non-limiting system that can facilitate analyzing one or more parameters of a quantum computer and characteristics of a quantum computer program to facilitate execution of the quantum computer program in accordance with one or more embodiments described herein.

FIG. 2 illustrates a block diagram of the example, non-limiting system 100 further comprising one or more parameter registries 202 in accordance with one or more embodiments described herein. Repetitive description of like elements employed in other embodiments described herein is omitted for sake of brevity. In various embodiments, the analysis component 114 can further analyze the one or more quantum computers 108 to derive the one or more parameters of the quantum computers 108. For example, the analysis component 114 can read one or more configuration files (e.g., JSON files) associated with the subject quantum computer program.

In various embodiments, the analysis component 114 can further monitor the quantum computers 108 to determine whether quantum computers 108 are removed or added to the system 100. Thereby, the analysis component 114 can maintain an updated analysis of all the quantum computers 108 that are comprised within the system 100 and/or able to execute quantum computer programs. Further, the analysis component 114 can periodically analyze the one or more quantum computers 108 to check for one or more changes in the parameters of the quantum computers 108. For example, the analysis component 114 can periodically analyze the one or more quantum computers 108 to check for alterations (e.g., updates) to one or more hardware components of the one or more quantum computers 108 (e.g., an increase in the number of qubits comprised within a subject quantum computer 108).

In one or more embodiments, the analysis component 114 can store the derived parameters of the one or more quantum computers 108 within the one or more parameter registries 202. The one or more parameter registries 202 can be located within the one or more memories 116 (e.g., as shown in FIG. 2) and/or be located within one or more cloud computing environments (e.g., accessible via the one or more networks 104). Further, the analysis component 114 can update the parameters stored within the one or more parameter registries 202 in response to one or more changes detected during monitoring the one or more quantum computers 108. For example, the analysis component 114 can update the parameters stored within the one or more parameter registries 202 in response to one or more quantum computers 108 leaving or entering the system 100. In another example, the analysis component 114 can update the parameters stored within the one or more parameter registries 202 in response to one or more quantum computers 108 experiencing a modification, such as a hardware update.

In various embodiments, one or more users of the system 100 can enter parameters regarding the one or more quantum computers 108 directly into the one or more parameter registries 202 via the one or more input devices 106. Thereby, the one or more parameter registries 202 can be maintained autonomously by the analysis component 114 and/or manually by one or more users of the system 100. As a result, the dispatch component 110, and the associate components, can maintain an up-to-date analysis of the operational constraints and/or capacities of the one or more quantum computers 108.

Figure 3:
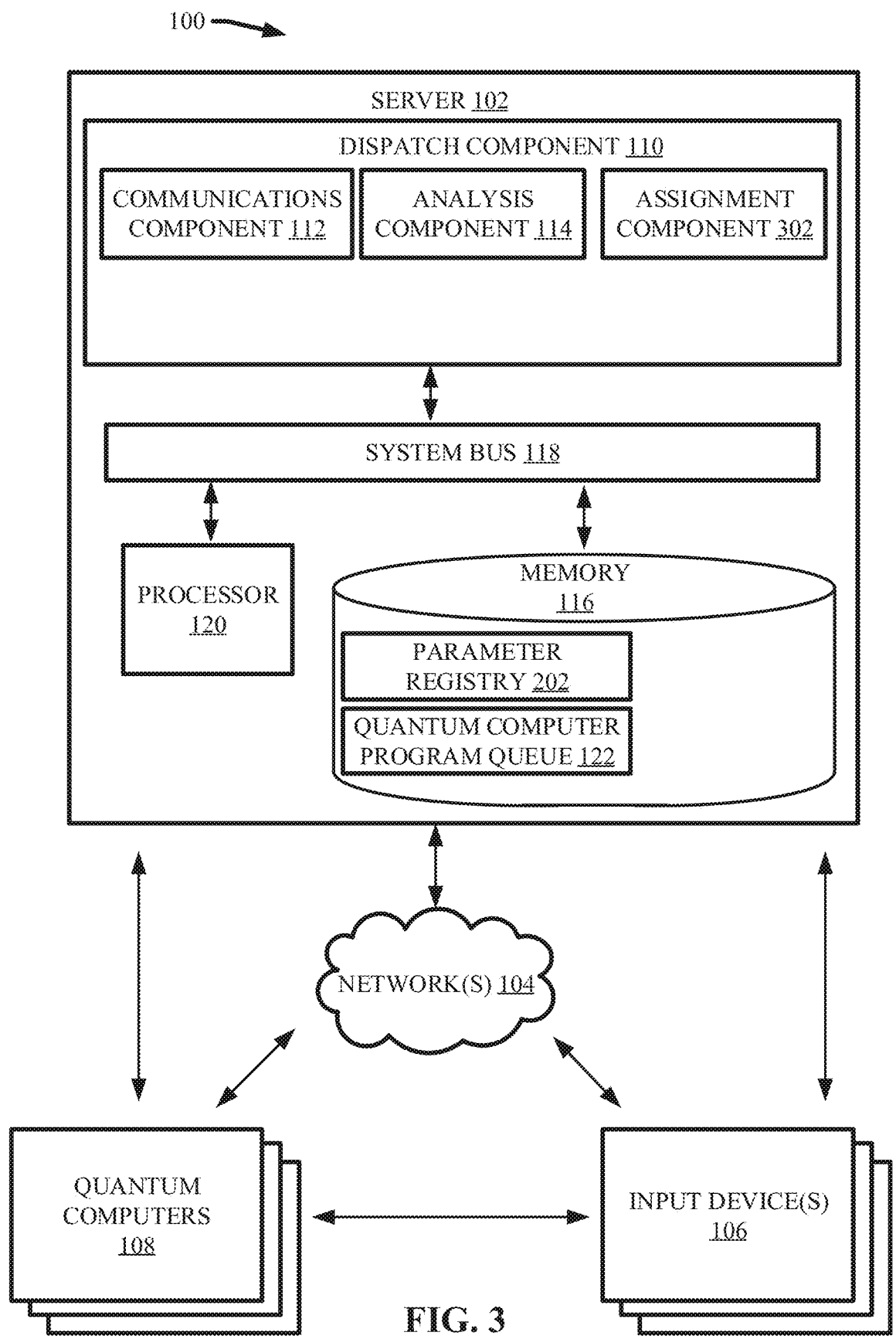
FIG. 3 illustrates a block diagram of an example, non-limiting system that can facilitate assigning one or more quantum computer programs to one or more quantum computers for execution in accordance with one or more embodiments described herein.

FIG. 3 illustrates a block diagram of the example, non-limiting system 100 further comprising assignment component 302 in accordance with one or more embodiments described herein. Repetitive description of like elements employed in other embodiments described herein is omitted for sake of brevity. In various embodiments, the assignment component 302 can assign one or more quantum computer programs comprised within the one or more quantum computer program ques 122 to one or more of the quantum computers 108 for execution.

For example, the assignment component 302 can assign a quantum computing program to a quantum computer 108 based on a comparison of the parameters of the one or more quantum computers 108 and the characteristics of the one or more quantum computer programs comprised within the quantum computer program queue 122. For instance, the assignment component 302 can compare the qubit configurations of the quantum computers 108 to the connectivity schemes of the quantum computer programs. In a further example, the assignment component 302 can compare the minimum operating requirements (e.g., as delineated by the characteristics of the quantum computer programs) of the quantum computer programs with the operating capacities of the quantum computers 108 (e.g., as delineated by the parameters of the quantum computers 108).

In various embodiments, the assignment component 302 can assign a quantum computer program to a quantum computer 108 having one or more parameters that meet the minimum system requirements required by the quantum computer program. Moreover, in one or more embodiments, the assignment component 302 can assign a quantum computer program based further on the characteristics of other quantum computer programs comprised within the quantum computer program queue 122. For example, wherein the operational requirements (e.g., as delineated by the one or more characteristics described herein) of a first quantum computer program can be fulfilled by a first quantum computer 108 or a second quantum computer 108 (e.g., both the first and the second quantum computers 108 have parameters meeting the minimum system requirements of the first quantum compute program), but only the first quantum computer 108 can fulfill the operational requirements of a second quantum computer program from the quantum computer program queue 122; then the assignment component 302 can assign the first quantum computer program to the second quantum computer 108 and the second quantum computer program to the first quantum computer 108 to increase efficiency of the system 100 in executing the quantum computer programs.

Further, wherein all the quantum computers 108 having parameters that meet the characteristics of a subject quantum computer program are busy executing other quantum computer programs, the assignment component 302 can assign the subject quantum computer program to another quantum computer 108 that has parameters nearly meeting the characteristics of the subject quantum computer program. Thereby, the assignment component 302 can assign a quantum computer program to an available quantum computer 108 (e.g., a quantum computer 108 not currently executing a quantum computer program) despite the available quantum computer 108 not having parameters that are in alignment with the characteristics of the quantum computer program. Additionally, the assignment component 302 can assign a quantum computer program to a quantum computer that has parameters misaligned with the characteristics of the quantum computer program (e.g., a quantum computer 108 that has a qubit configuration that cannot facilitate the connectivity scheme of the quantum computer program) even when other quantum computers 108 that have parameters aligned with the subject characteristics are available. For example, the assignment component 302 can assign a quantum computer program to a quantum computer that has parameters misaligned with the characteristics of the quantum computer program based on the characteristics of other quantum computer programs comprised within the quantum computer program queue 122 (e.g., to facilitate execution of the other quantum computer programs on the available quantum computers 108).

In one or more embodiment, the assignment component 302 can assign the quantum computer programs to the quantum computers 108 in a manner that optimizes performance of the quantum computer program. For example, the assignment component 302 can assign the quantum computer programs to the quantum computers 108 to reduce an average execution time of the quantum computer programs (e.g., by reducing the average time a quantum computer program remains waiting for execution) and/or balance a work load executing the quantum computer programs amongst the quantum computers 108 (e.g., avoid relying on a few quantum computers 108 to perform a disproportionate amount of the executions). In addition, the assignment component 302 can perform the assignments in an order dictated by the arrangement of the quantum computer programs within the quantum computer program queue 122 and/or a preference of a user of the system 100 (e.g., which can be entered into the system 100 via the one or more input devices 106). For example, the assignment component 302 can perform the assignments in the order at which the quantum computer programs are stored within the one or more quantum computer program ques 122 (e.g., the first quantum computer programs entered into the quantum computer program queue 122 are the first quantum computer programs assigned to one or more quantum computers 108).

Figure 4:
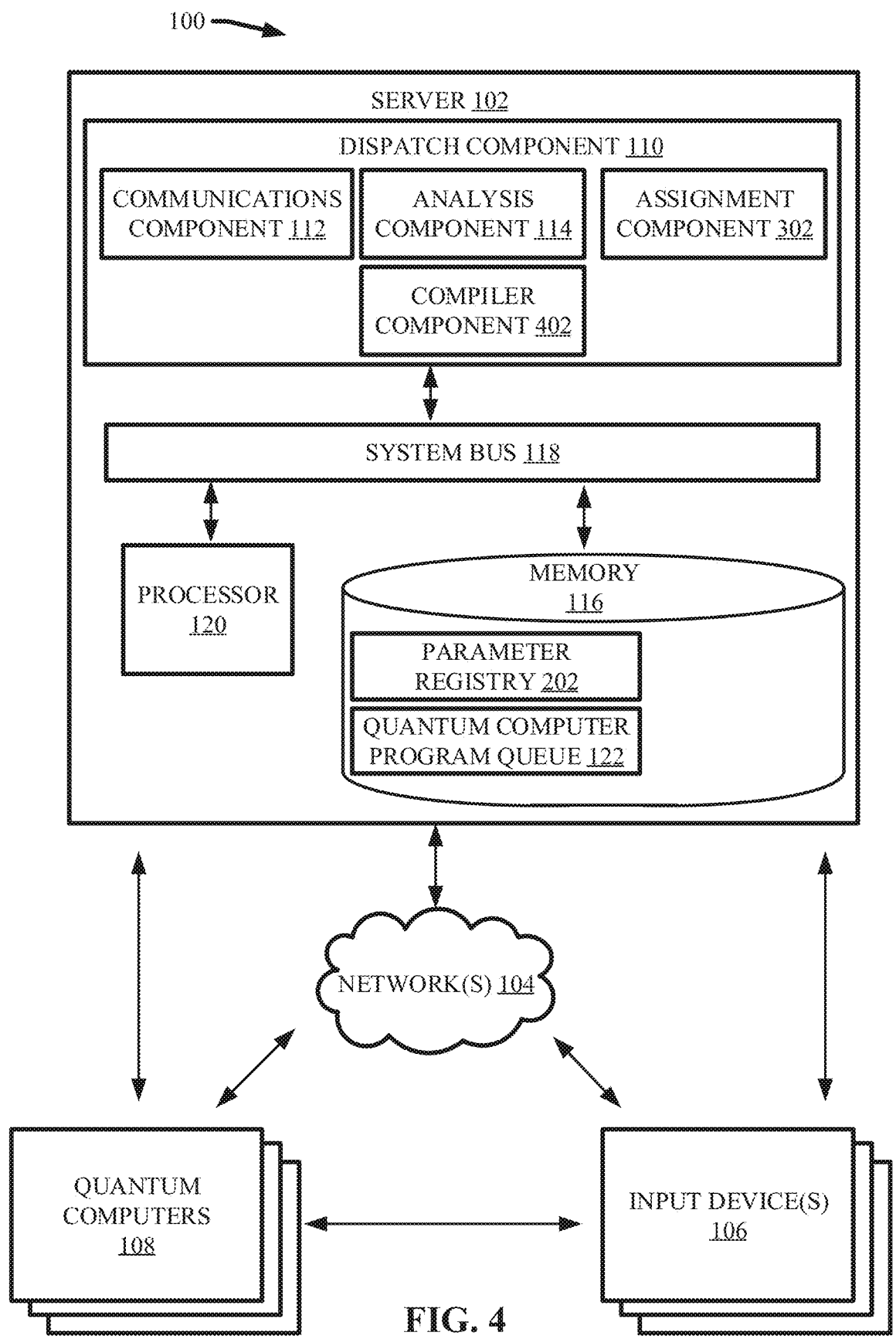
FIG. 4 illustrates a block diagram of an example, non-limiting system that can facilitate adapting one or more quantum computer programs for execution on an assigned quantum computer in accordance with one or more embodiments described herein.

FIG. 4 illustrates a block diagram of the example, non-limiting system 100 further comprising compiler component 402 in accordance with one or more embodiments described herein. Repetitive description of like elements employed in other embodiments described herein is omitted for sake of brevity. In various embodiments, the compiler component 402 can adapt one or more quantum circuits of an assigned quantum computer program, compile the one or more adapted quantum circuits, and/or send the adapted quantum computer program to the assigned quantum computer 108.

In various embodiments, the compiler component 402 can adapt one or more quantum circuits of an assigned quantum computer program to comply with one or more parameters of the quantum computer 108 to which the quantum computer program is assigned. For example, the compiler component 402 can modify one or more characteristics of the assigned quantum computer program (e.g., via one or more alterations to one or more quantum circuits) to facilitate the adaptation.

For instance, the compiler component 402 can re-map a connectivity of one or more the quantum circuits comprised within the assigned quantum computer program to meet one or more parameters of the quantum computer 108 assigned to execute the subject quantum computer program. Wherein a qubit configuration of the assigned quantum computer 108 cannot facilitate execution of the assigned quantum computer program's connectivity scheme, the compiler component 402 can adapt one or more quantum circuits of the assigned quantum computer program by introducing one or more operations that can serve to re-map the connectivity of the quantum circuits while maintaining the functionality of the quantum computer program. For example, the one or more re-mapping operations can move one or more quantum states of the quantum circuits from the originally developed connections to new connections that can be executed by the qubit configuration of the assigned quantum computer 108. For instance, wherein the assigned quantum computer program's connectivity scheme delineates a direct connection between a first qubit and a second qubit, but the first and second qubits are not directly connected in the qubit configuration of the assigned quantum computer 108; the compiler component 402 can adapt one or more quantum circuits of the assigned quantum computer program via one or more connectivity re-mapping operations that can serve to move the quantum state of the quantum circuits such that the quantum circuits can be executed by the subject qubit configuration (e.g., in which the first and second qubit are not directly connected) while maintaining the functionality of the assigned quantum computer program's originally developed connectivity scheme (e.g., in which the first and second qubit are directly connected).

An example re-mapping operation can include modifying one or more quantum circuits such that one or more quantum gates comprised within the quantum circuits use qubits in the assigned quantum computer 108 that are connected. For instance, the compiler component 402 can add one or more CX quantum gates to the subject quantum circuits to modify the originally developed quantum gates; thereby swapping the qubits targeted by the quantum circuits until compatibility with the parameters of the assigned quantum computer 108 is reached.

Once the quantum circuits are adapted, the compiler component 402 can further compile the adapted quantum circuits to generate an adapted quantum computer program. The adapted quantum computer program can comprise the assigned quantum computer program modified to meet the operation requirements (e.g., as defined by the parameters) of the one or more assigned quantum computers 108. Further, the compiler component 402 can dispatch the adapted quantum computer program to the one or more assigned quantum computers 108 via a direct electrical connection, the one or more networks 104, and/or a cloud computing environment.

Advantageously, the compiler component 402 can adapt one or more quantum computer programs developed for execution on a first quantum computer 108 to meet the parameters of a second quantum computer 108. Thereby, the dispatch component 110 can dispatch a quantum computer program to a quantum computer 108 in a manner that increases the efficiency of the system 100 (e.g., reduces average execution time and/or balances a workload amongst the quantum computers 108) despite the quantum computer program being originally developed based on the parameters of a different quantum computer 108. By adapting the quantum computer programs to the system requirements (e.g., as delineated by the parameters) of the quantum computers 108, the dispatch component 110 can choose from a larger pool of quantum computers 108 for the dispatchment of the quantum computer programs than would otherwise be enabled without the adaptations.

Figure 5:
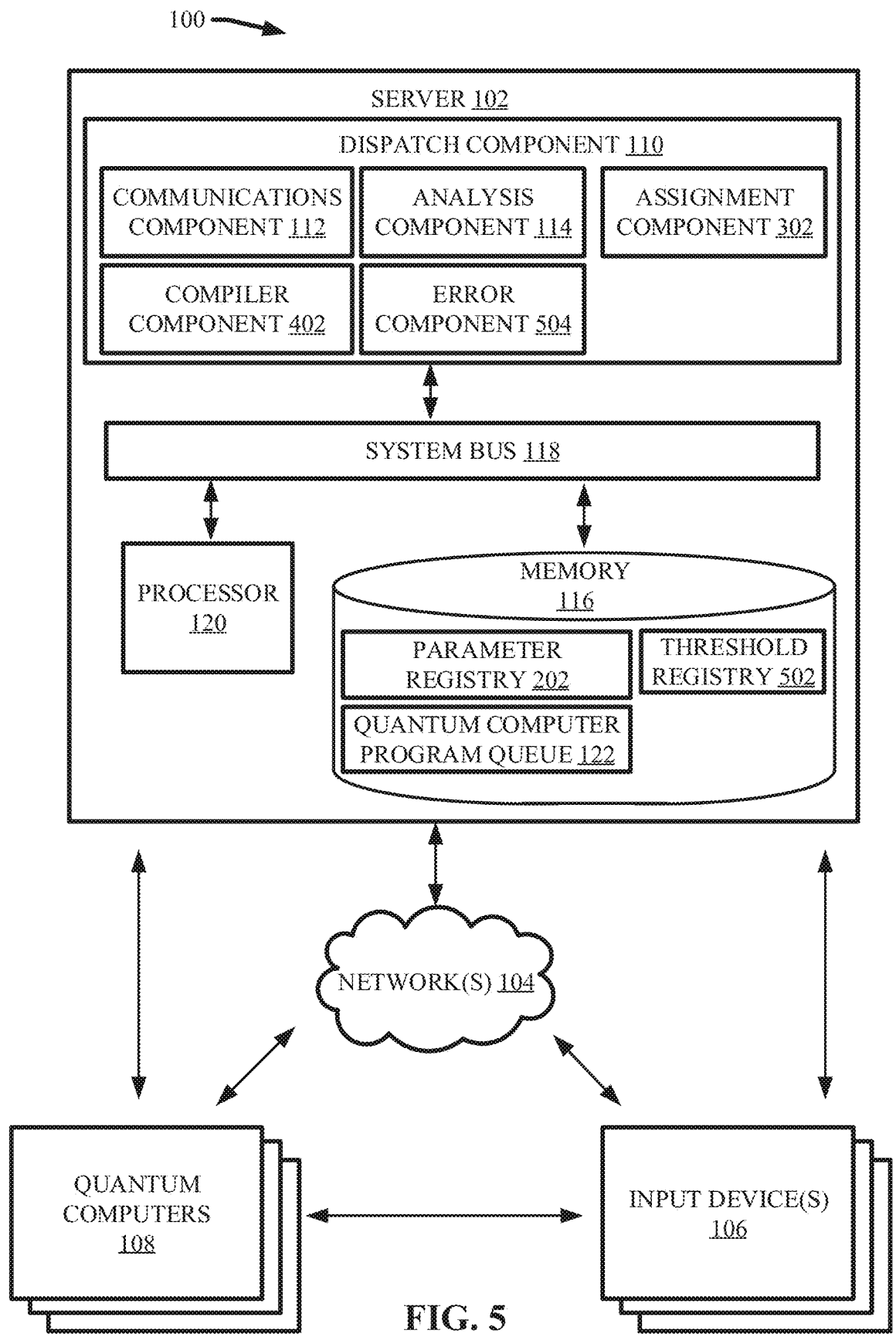
FIG. 5 illustrates a block diagram of an example, non-limiting system that can facilitate adapting one or more quantum computer programs for execution on an assigned quantum computer in accordance with one or more embodiments described herein.

FIG. 5 illustrates a block diagram of the example, non-limiting system 100 further comprising one or more threshold registries 502 and/or error components 504 in accordance with one or more embodiments described herein. Repetitive description of like elements employed in other embodiments described herein is omitted for sake of brevity. In various embodiments, the compiler component 402 can adapt the one or more quantum circuits of an assigned quantum computer program based on one or more error rate thresholds stored within the threshold registry 502.

The one or more threshold registries 502 can comprise one or more quantum computing error rates that can characterize the one or more quantum computer programs. The one or more threshold registries 502 can be located within the one or more memories 116 (e.g., as shown in FIG. 5) and/or within a cloud computing environment (e.g., accessible via the one or more networks 104). In one or more embodiments, the compiler component's 402 modification of the one or more quantum circuits can affect a quantum computing error rate of the assigned quantum computer program. For example, adapting the quantum circuits can increase or decrease the quantum computing error rate. In various embodiments, the adapted quantum computing program can be characterized by a quantum computing error rate that is greater than, equal to, or less than the quantum computing error rate of the quantum computer program as originally developed.

In various embodiments, the compiler component 402 can adapt an assigned quantum computer program to an extent at which the adapted quantum computer program has a quantum computing error rate that is equal to or less than a defined threshold. For example, the defined threshold can be a quantum computing error rate threshold set by a user of the system 100 via the one or more input devices 106 and/or stored in the one or more threshold registries 502. In another example, the defined threshold can be the quantum computing error rate that characterizes the quantum computer program as originally developed, which can be derived by the analysis component 114 as one of the characteristics of the quantum computing program and/or can be stored in the one or more threshold registries 502.

In one or more embodiments, the compiler component 402 can adapt one or more of the assigned quantum computing programs to lower the quantum computing error rate of the subject quantum computer program in addition to facilitating dispatching the quantum computer programs in accordance with the assignments by the assignment component 302. In various embodiments, the compiler component 402 can adapt one or more of the quantum computing programs to facilitate the dispatching described herein so long as the resulting adapted quantum computer program has a quantum computing error rate equal to or less than the defined threshold (e.g., a quantum computing error rate equal to or less than the quantum computing error rate of the quantum computer program as originally developed).

In various embodiments, the error component 504 can analyze adapted quantum computer programs prior to dispatchment of the adapted quantum computer programs to the one or more assigned quantum computers 108. The error component 504 can analyze one or more adapted quantum computer programs to estimate a quantum computing error rate that can characterize the one or more adapted quantum computing programs.

Wherein the estimated quantum computing error rate of a subject adapted quantum computer program is less than or equal to a defined error rate threshold (e.g., a preferred error rate threshold or the quantum computing error rate threshold of the quantum computer program as originally developed), which can be set be a user of the system 100, the error component 504 can enable the compiler component 402 to dispatch the adapted quantum computer program. In contrast, wherein the estimated quantum computing error rate of the subject adapted quantum computer is greater than the defined error rate threshold, the error component 504 can instruct the compiler component 402 to re-adapt the quantum computer program to meet the parameters of the assigned quantum computer 108 in a different manner. For example, the compiler component 402 can re-map the connectivity of the quantum computer program via an alternate connectivity re-mapping operation to achieve an alternate adapted quantum computing program that can be re-analyzed by the error component 504. Further, the error component 504 can repeatedly instruct the compiler component 402 to re-adapt the quantum computer program using respective modifications until the compiler components 402 generates an adapted quantum computer program with an estimated quantum computing error rate that is less than or equal to the defined error rate threshold. Wherein the compiler component 402 has exhausted the possible functional modifications to the quantum computer program and has yet to achieve an adapted version of the quantum computer program that meets the threshold requirements, the compiler component 402 can instruct the assignment component 302 to re-assign the subject quantum computer program to another quantum computer 108. Whereupon the compiler component 402 can re-initiate the adaptation process based on the parameters of the newly assigned quantum computer 108.

Figure 6:
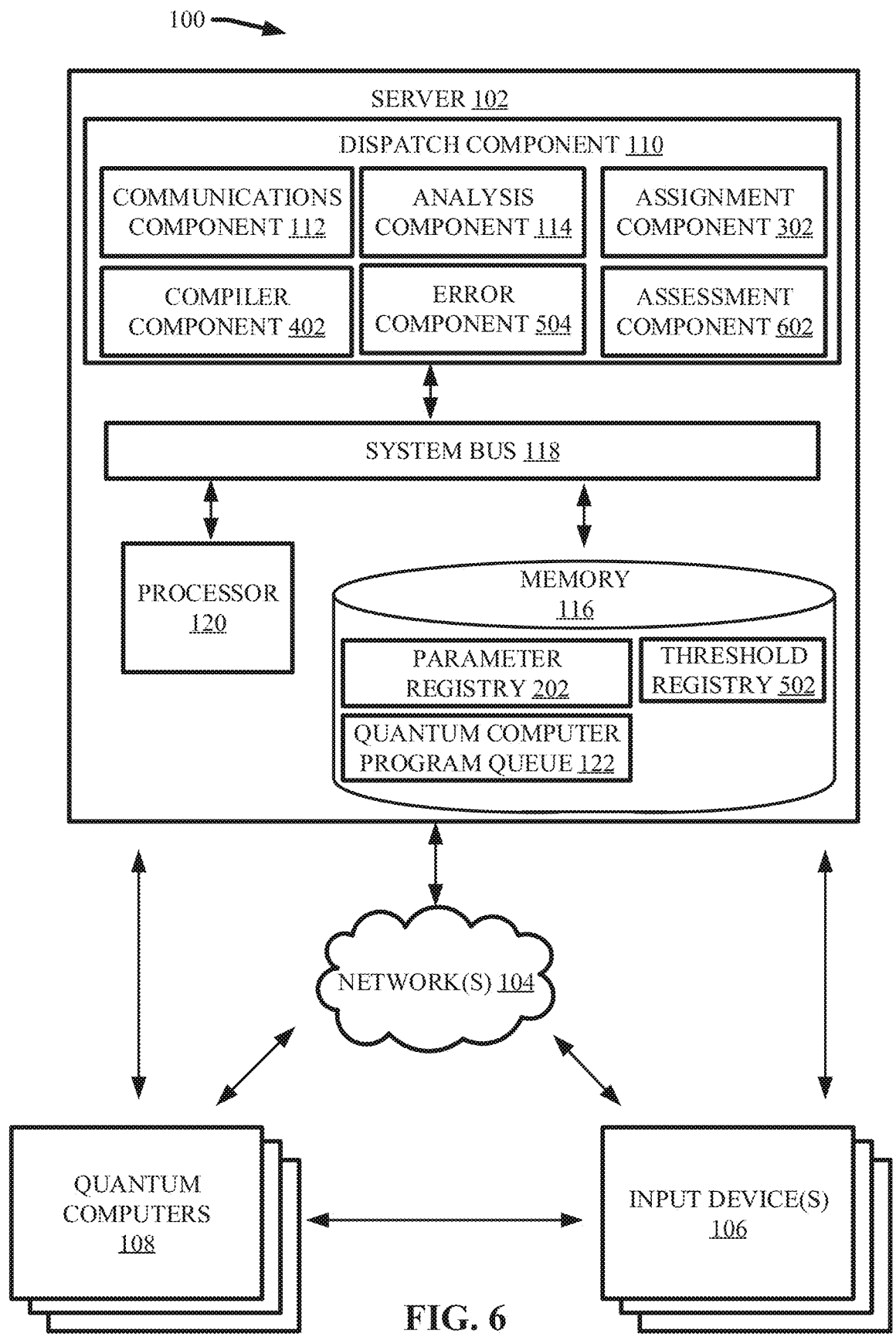
FIG. 6 illustrates a block diagram of an example, non-limiting system that can facilitate assessing the operation results of one or more quantum computer programs on one or more quantum computers in accordance with one or more embodiments described herein.

FIG. 6 illustrates a block diagram of the example, non-limiting system 100 further comprising assessment component 602 in accordance with one or more embodiments described herein. Repetitive description of like elements employed in other embodiments described herein is omitted for sake of brevity. In various embodiments, the assessment component 602 can monitor execution of the one or more quantum computer programs (e.g., the one or more adapted quantum computer programs) on the one or more assigned quantum computers 108.

For example, the assessment component 602 can gather result data regarding performance of the one or more quantum computer programs (e.g., the one or more adapted quantum computer programs) on the one or more assigned quantum computers 108. The result data can be utilized by the dispatch component 110 (e.g., via the assignment component 302 and/or compiler component 402) to influence future assignment and/or adaptation processes. Example result data can include, but is not limited to: an observed quantum computing error rate, the quantum computer 108 utilized to execute the quantum computer program, the function of the executed quantum computer program executed, adaptations incorporated into the executed quantum computer program by the compiler component 402, a combination thereof, and/or the like.

Figure 7:
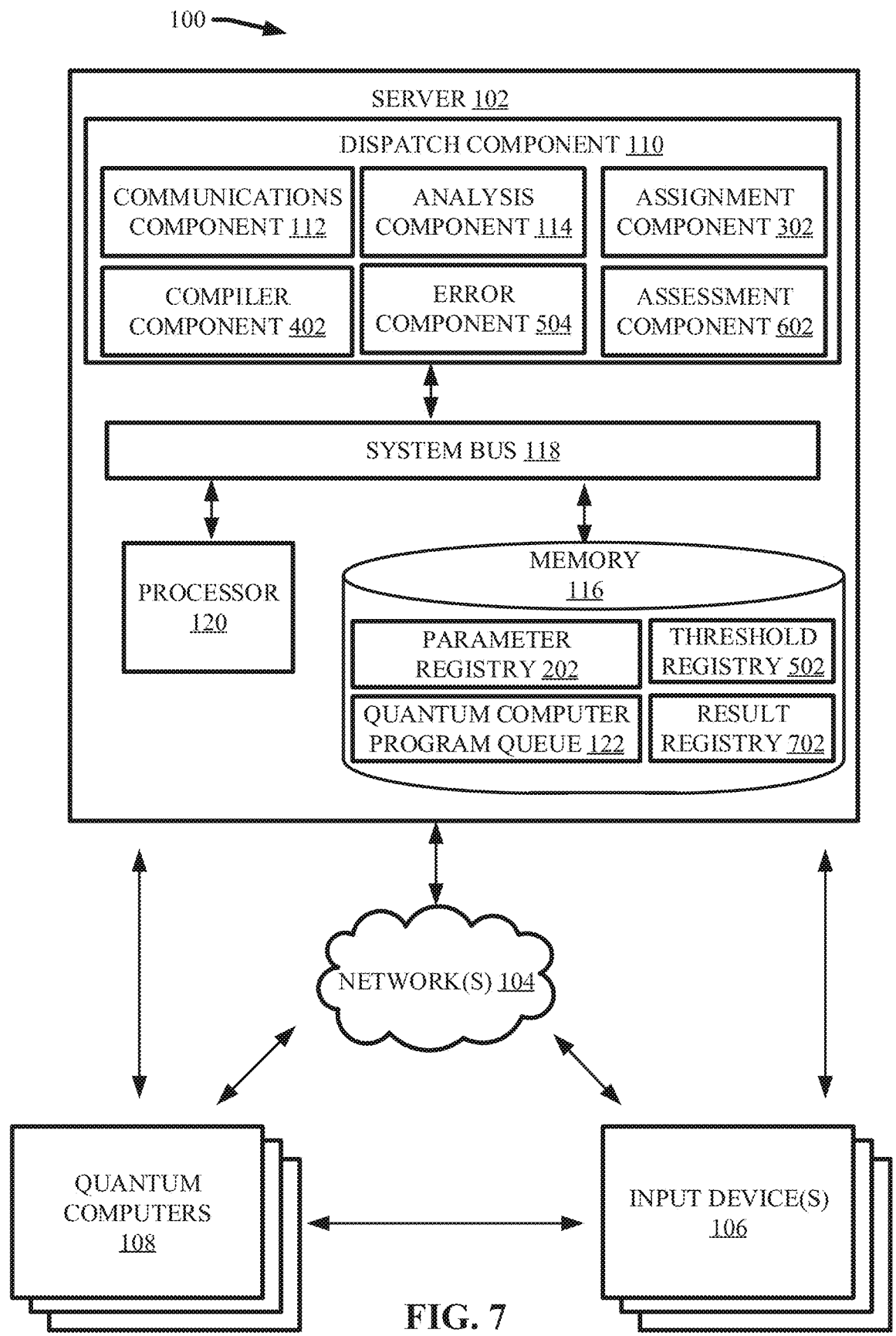
FIG. 7 illustrates a block diagram of an example, non-limiting system that can facilitate assessing the operation results of one or more quantum computer programs on one or more quantum computers in accordance with one or more embodiments described herein.

FIG. 7 illustrates a block diagram of the example, non-limiting system 100 further comprising one or more result registries 702 in accordance with one or more embodiments described herein. Repetitive description of like elements employed in other embodiments described herein is omitted for sake of brevity. In various embodiments, the assessment component 602 can store the result data in the one or more result registries 702. The one or more result registries 702 can be located within the one or more memories 116 and/or within a cloud computing environment.

In various embodiments, the assessment component 602 can further analyze the result data comprised within the one or more result registries 702 to determine one or more operation properties of the quantum computers 108 that can be considered in subsequent assignments and/or adaptations of quantum computer programs. For example, the assessment component 602 can utilize one or more machine learning algorithms to identify patterns in the result data that can characterize the operation history of one or more of the quantum computers 108. For instance, the assessment component 602 can analyze the result data to determine which quantum computers 108 have historically shown the lowest quantum computing error rates with respect to quantum computing programs of a certain type. In another instance, the assessment component 602 can analyze the result data and determine to determine which connectivity re-mapping operations have historically resulted in adapted quantum computer programs with the lowest observed quantum computing error rates.

In one or more embodiments, the assignment component 302 can assign one or more of the quantum computer programs to one or more quantum computers 108 based further on one or more determinations of the assessment component 602. For example, wherein the assessment component 602 identifies a quantum computer 108 as having a tendency to execute quantum computer programs of a certain type (e.g., quantum computer programs that perform a certain categorical function, such as image recognition) with a low quantum computing error rate (e.g., as compared to the other quantum computers 108); the assignment component 302 can prioritize subject quantum computer 108 as an assignment target for quantum computer programs of the certain type.

Additionally, in one or more embodiments the compiler component 402 can adapt one or more of the quantum computer programs in a manner that is further based on one or more determinations of the assessment component 602. For example, wherein the assessment component 602 identifies a connectivity re-mapping operation as having particular success in achieving adapted quantum computer programs with low quantum computing error rates (e.g., observed error rates below the error rate threshold); the compiler component 402 can prioritize implementation of the subject connectivity re-mapping operation when addressing discrepancies between the parameters of the assigned quantum computer 108 and the characteristics of the assigned quantum computer program.

Advantageously, the dispatch component 110 (e.g., via the error component 504) can adapt the one or more quantum computer programs to achieve a dispatchment scheme characterized by desired quantum computing error rates; thereby optimizing the performance of the quantum computer programs within the system 100. Further, the dispatch component 110 (e.g., via the assessment component 602) can utilize one or more machine learning algorithms to learn from result data and fine-tune future operations.

Figure 8:
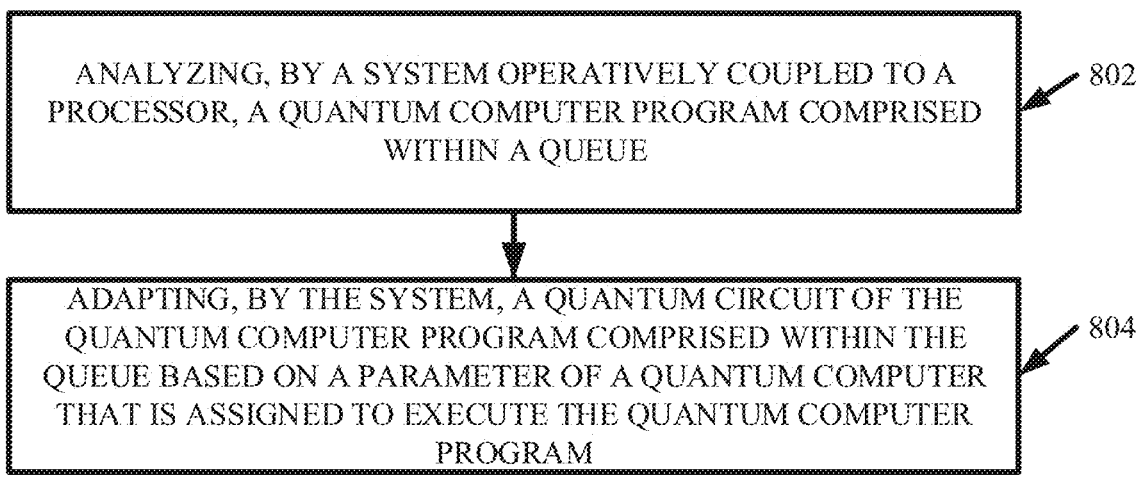
FIG. 8 illustrates a flow diagram of an example, non-limiting method that can facilitate dispatching one or more adapted quantum computer programs to one or more quantum computers in accordance with one or more embodiments described herein.

FIG. 8 illustrates a flow diagram of an example, non-limiting method 800 that can facilitate dispatching one or more quantum computer programs to one or more quantum computers 108 in accordance with one or more embodiments described herein. Repetitive description of like elements employed in other embodiments described herein is omitted for sake of brevity.

At 802, the method 800 can comprise analyzing, by a system 100 (e.g., via the analysis component 114) operatively coupled to a processor 120, one or more quantum computer programs comprised within a queue (e.g., quantum computer program queue 122). For example, the one or more quantum computer programs can be entered into the system 100 (e.g., entered into the que) via one or more input devices 106. Further, the analyzing at 802 can comprise determining one or more characteristics of the one or more quantum computer programs. Example characteristics can include, but are not limited to: a connectivity scheme of the one or more quantum circuits comprised within the quantum computer programs (e.g., including the number and/or type of features comprised within the quantum circuits, such as qubits and/or quantum gates, and how the features are interconnected), an error rate that characterizes performance of the quantum computer program, a function of the quantum computer program, minimum system requirements for executing the quantum computer program, a combination thereof, and/or the like. In one or more embodiments, the analyzing at 802 can further comprise determining (e.g., via the analysis component 114) one or more parameters of one or more quantum computers 108 comprised within the system 100.

At 804, the method 800 can comprise adapting, by the system 100 (e.g., via the compiler component 402), one or more quantum circuits of the one or more quantum computer programs comprised within the queue (e.g., quantum computer program queue 122) based on one or more parameters of the one or more quantum computers 108 that are assigned to execute the one or more quantum computer programs. Example parameters can include, but are not limited to: a quantum computer's 108 qubit configuration (e.g., including the number, connectivity, and/or properties of qubits comprised within the quantum computer 108), the construction type of a quantum computer 108 (e.g., whether a subject quantum computer is an adiabatic quantum computer, a cluster-state quantum computer, or a gate-based quantum computer), a quantum computer's 108 quantum gate configuration (e.g., including the number, type, position, and/or connectivity of quantum gates included in the subject quantum computer 108), a combination thereof, and/or the like.

In various embodiments, the adapting at 804 can comprise one or more connectivity re-mapping operations that modify one or more characteristics of the one or more quantum computer programs to comply with one or more parameters of one or more quantum computers 108. For example, the adapting at 804 can comprise modifying a connectivity scheme of one or more of the quantum circuits to enable execution of the subject quantum computer program by the qubit configuration of the one or more assigned quantum computers 108.

Figure 9:
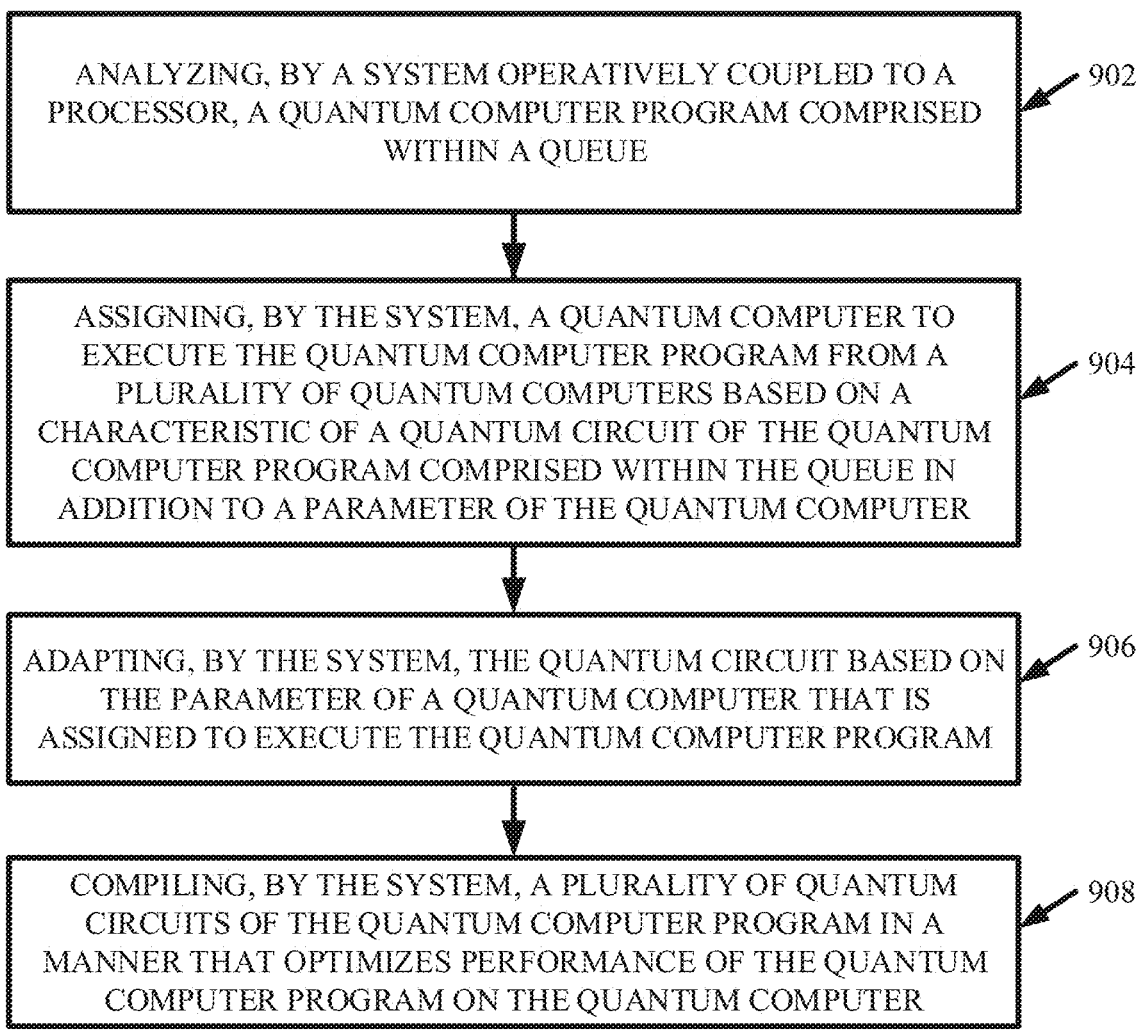
FIG. 9 illustrates a flow diagram of an example, non-limiting method that can facilitate dispatching one or more adapted quantum computer programs to one or more quantum computers in accordance with one or more embodiments described herein.

FIG. 9 illustrates a flow diagram of an example, non-limiting method 900 that can facilitate dispatching one or more quantum computer programs to one or more quantum computers 108 in accordance with one or more embodiments described herein. Repetitive description of like elements employed in other embodiments described herein is omitted for sake of brevity.

At 902, the method 900 can comprise analyzing, by a system 100 (e.g., via the analysis component 114) operatively coupled to a processor 120, one or more quantum computer programs comprised within a queue (e.g., quantum computer program queue 122). For example, the one or more quantum computer programs can be entered into the system 100 (e.g., entered into the que) via one or more input devices 106. Further, the analyzing at 802 can comprise determining one or more characteristics of the one or more quantum computer programs. Example characteristics can include, but are not limited to: a connectivity scheme of the one or more quantum circuits comprised within the quantum computer programs (e.g., including the number and/or type of features comprised within the quantum circuits, such as qubits and/or quantum gates, and how the features are interconnected), an error rate that characterizes performance of the quantum computer program, a function of the quantum computer program, minimum system requirements for executing the quantum computer program, a combination thereof, and/or the like. In one or more embodiments, the analyzing at 902 can further comprise determining (e.g., via the analysis component 114) one or more parameters of one or more quantum computers 108 comprised within the system 100.

At 904, the method 900 can comprise assigning, by the system 100 (e.g., via the assignment component 302), one or more quantum computers 108 to execute the one or more quantum computer programs from a plurality of quantum computers 108 based on a characteristic of one or more quantum circuits of the one or more quantum computer programs comprised within the queue in addition to one or more parameters of the one or more quantum computers 108. Example parameters can include, but are not limited to: a quantum computer's 108 qubit configuration (e.g., including the number, connectivity, and/or properties of qubits comprised within the quantum computer 108), the construction type of a quantum computer 108 (e.g., whether a subject quantum computer is an adiabatic quantum computer, a cluster-state quantum computer, or a gate-based quantum computer), a quantum computer's 108 quantum gate configuration (e.g., including the number, type, position, and/or connectivity of quantum gates included in the subject quantum computer 108), a combination thereof, and/or the like. In various embodiments, the assigning at 904 can comprise assigning the one or more quantum computer programs to one or more available quantum computers 108 (e.g., one or more quantum computers not currently executing another quantum computer program). Further, the one or more quantum computer programs can be assigned to one or more quantum computers 108 having parameters that comport with, or nearly comport with, the characteristics of the one or more quantum computer programs.

At 906, the method 900 can comprise adapting, by the system 100 (e.g., via the compiler component 402), one or more quantum circuits of the one or more quantum computer programs comprised within the queue (e.g., quantum computer program queue 122) based on one or more parameters of the one or more quantum computers 108 that are assigned to execute the one or more quantum computer programs. Example parameters can include, but are not limited to: a quantum computer's 108 qubit configuration (e.g., including the number, connectivity, and/or properties of qubits comprised within the quantum computer 108), the construction type of a quantum computer 108 (e.g., whether a subject quantum computer is an adiabatic quantum computer, a cluster-state quantum computer, or a gate-based quantum computer), a quantum computer's 108 quantum gate configuration (e.g., including the number, type, position, and/or connectivity of quantum gates included in the subject quantum computer 108), a combination thereof, and/or the like.

In various embodiments, the adapting at 906 can comprise one or more connectivity re-mapping operations that modify one or more characteristics of the one or more quantum computer programs to comply with one or more parameters of one or more quantum computers 108. For example, the adapting at 906 can comprise modifying a connectivity scheme of one or more of the quantum circuits to enable execution of the subject quantum computer program by the qubit configuration of the one or more assigned quantum computers 108.

At 908, the method 900 can comprise compiling, by the system 100 (e.g., via the compiler component 402), a plurality of quantum circuits of the one or more quantum computer programs in a manner that optimizes performance of the one or more quantum computer programs on the one or more quantum computers 108. For example, the compiling at 908 can facilitate: reduction of an average execution time of the quantum computer program, reduction of an estimated error rate that characterizes execution the quantum computer program, a balancing of a work load of the one or more quantum computers 108, a combination thereof, and/or the like. Further, the method 900 can comprise dispatching the one or more quantum computer programs (e.g., the one or more adapted quantum computer programs) to the one or more assigned quantum computers 108.

In various embodiments, the method 900 can further comprise monitoring (e.g., via the error component 504) the estimated quantum computing error rate of adapted quantum computer programs prior to dispatchment in order to ensure that the quantum computer programs are not modified in manner resulting in a quantum computing error rate that exceeds a defined threshold. Moreover, in one or more embodiments the method 900 can also comprise assessing (e.g., via assessment component 602) the operation history of the one or more quantum computers 108 to identify one or more patterns and/or trends that future assignments and/or adaptations can take into consideration.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
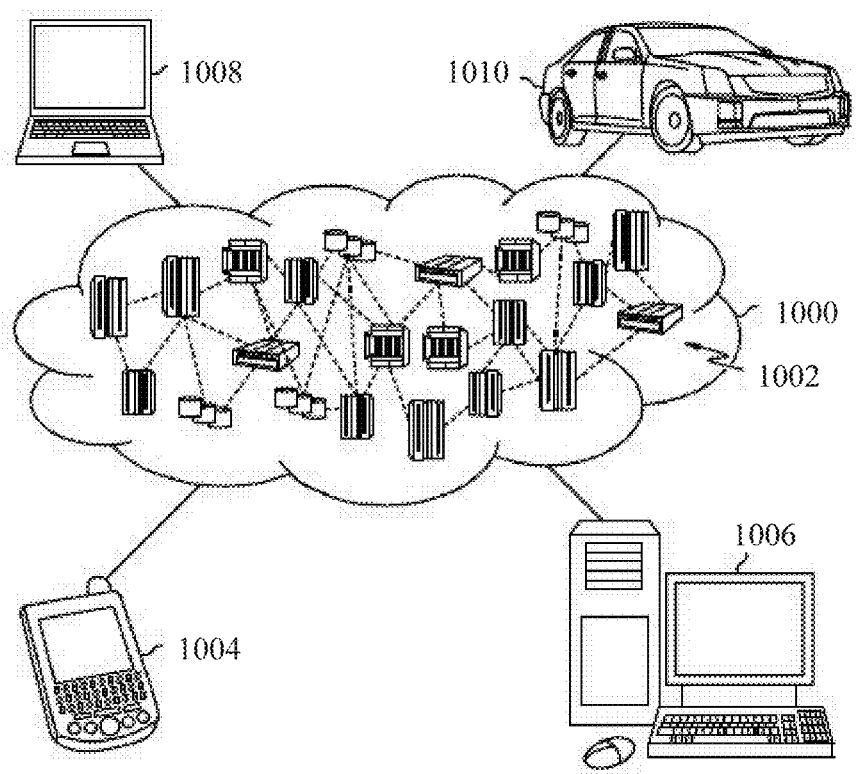
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
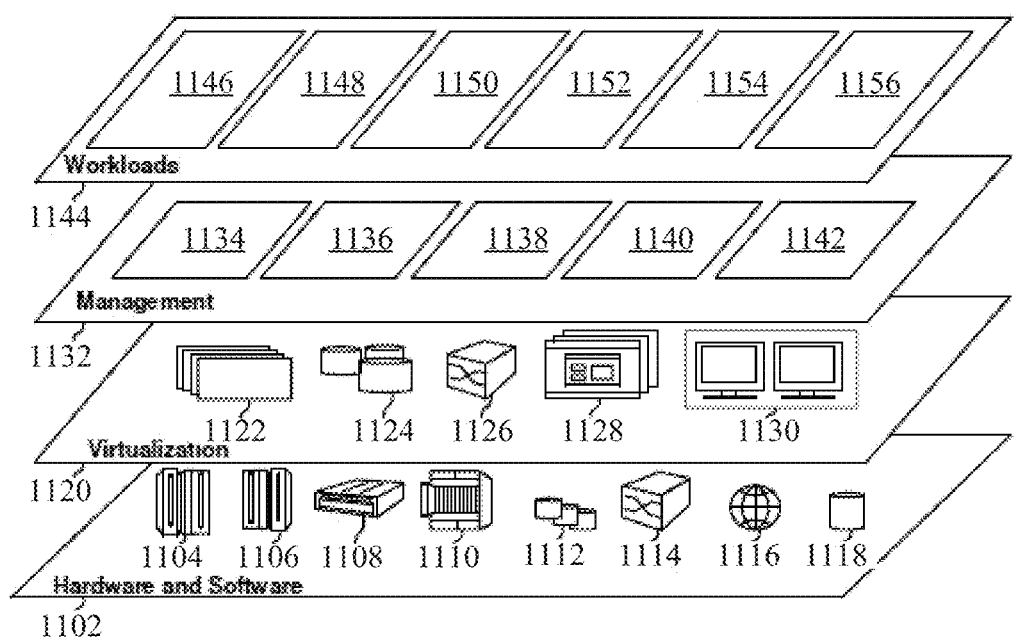
FIG. 11 depicts abstraction model layers in accordance with one or more embodiments described herein

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and quantum computer program modification and/or dispatchment 1156. Various embodiments of the present invention can utilize the cloud computing environment described with reference to FIGS. 10 and 11 to analyze, assign, adapt, and/or dispatch one or more quantum computer programs, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
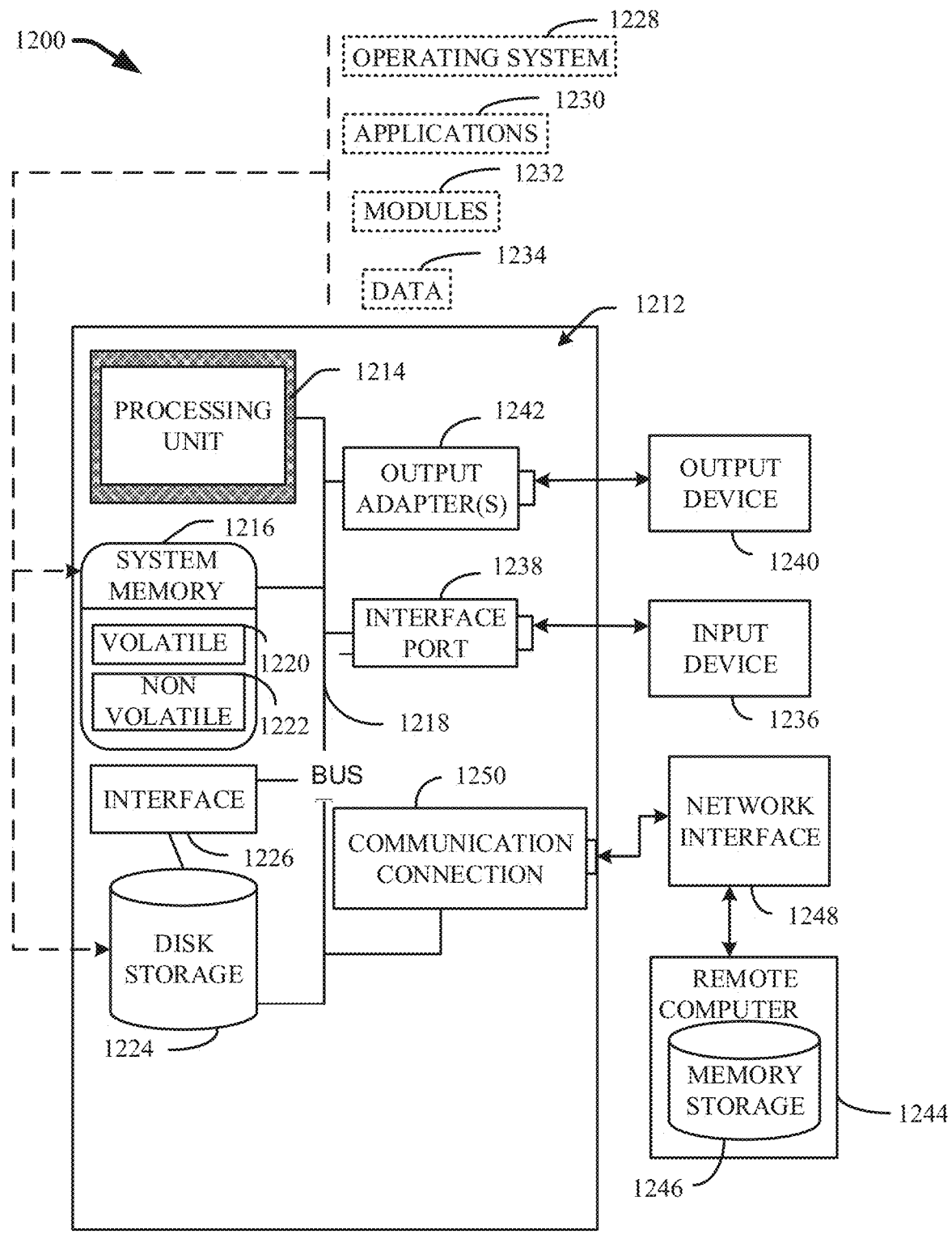
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity. With reference to FIG. 12, a suitable operating environment 1200 for implementing various aspects of this disclosure can include a computer 1212. The computer 1212 can also include a processing unit 1214, a system memory 1216, and a system bus 1218. The system bus 1218 can operably couple system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, can be stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface can be used, such as interface 1226. FIG. 12 also depicts software that can act as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 can take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through one or more input devices 1236. Input devices 1236 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1214 through the system bus 1218 via one or more interface ports 1238. The one or more Interface ports 1238 can include, for example, a serial port, a parallel port, a game port, and a universal serial bus (USB). One or more output devices 1240 can use some of the same type of ports as input device 1236. Thus, for example, a USB port can be used to provide input to computer 1212, and to output information from computer 1212 to an output device 1240. Output adapter 1242 can be provided to illustrate that there are some output devices 1240 like monitors, speakers, and printers, among other output devices 1240, which require special adapters. The output adapters 1242 can include, by way of illustration and not limitation, video and sound cards that provide a means of connection between the output device 1240 and the system bus 1218. It should be noted that other devices and/or systems of devices provide both input and output capabilities such as one or more remote computers 1244.

Computer 1212 can operate in a networked environment using logical connections to one or more remote computers, such as remote computer 1244. The remote computer 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer 1244. Remote computer 1244 can be logically connected to computer 1212 through a network interface 1248 and then physically connected via communication connection 1250. Further, operation can be distributed across multiple (local and remote) systems. Network interface 1248 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor, operably coupled to the memory, and that executes the computer executable components stored in the memory, wherein the computer executable components comprise:
a dispatch component that adapts a quantum circuit of a quantum computer program comprised within a queue based on a parameter of a quantum computer that is assigned to execute the quantum computer program, wherein the quantum computer program is arranged within the queue based on one or more of a size of the quantum computer program, a type of quantum computer program, a function of the quantum computer program or the origin of the quantum computer program, wherein the dispatch component adapts the quantum circuit by re-mapping a connectivity scheme of the quantum circuit based on the parameter.

2. The system of claim 1, wherein the parameter includes at least one member selected from a group consisting of: a configuration, a quantum computer construction type, and a quantum gate configuration.

3. The system of claim 1, further comprising:
an assignment component that assigns the quantum computer to execute the quantum computer program from a plurality of quantum computers, wherein the assignment component assigns the quantum computer based on a characteristic of the quantum circuit in addition to the parameter of the quantum computer.

4. The system of claim 3, wherein the parameter is a qubit configuration of the quantum computer, and wherein the characteristic is a connectivity scheme of the quantum circuit.

5. The system of claim 1, wherein the quantum circuit is comprised within a plurality of quantum circuits of the quantum computer program, and wherein the system further comprises:
a compiler component that compiles the plurality of quantum circuits in a manner that optimizes performance of the quantum computer program on the quantum computer.

6. The system of claim 5, wherein the manner comprises re-mapping a connectivity scheme of the quantum circuit to optimize the performance of the quantum computer program on the quantum computer.

7. The system of claim 5, wherein performance of the quantum computer program is optimized via a reduction of an average execution time of the quantum computer program.

8. The system of claim 5, wherein the performance of the quantum computer program is optimized via a reduction in an estimated error rate that characterizes execution the quantum computer program.

9. The system of claim 5, wherein the quantum computer is comprised within a plurality of quantum computers, and the performance of the quantum computer program is optimized by balancing a work load of the quantum computer with respect to the plurality of quantum computers.

10. A computer-implemented method, comprising:
adapting, by a system operatively coupled to a processor, a quantum circuit of a quantum computer program comprised within a queue based on a parameter of a quantum computer that is assigned to execute the quantum computer program, wherein the quantum computer program is arranged within the queue based on one or more of a size of the quantum computer program, a type of quantum computer program, a function of the quantum computer program or the origin of the quantum computer program, wherein the quantum circuit is adapted by re-mapping a connectivity scheme of the quantum circuit based on the parameter.

11. The computer-implemented method of claim 10, further comprising:
assigning, by the system, the quantum computer to execute the quantum computer program from a plurality of quantum computers based on a characteristic of the quantum circuit in addition to the parameter of the quantum computer.

12. The computer-implemented method of claim 11, wherein the parameter is a qubit configuration of the quantum computer, and wherein the characteristic is a connectivity of the quantum circuit.

13. The computer-implemented method of claim 11, wherein the quantum circuit is comprised within a plurality of quantum circuits of the quantum computer program, and wherein the computer-implemented method further comprises:
compiling, by the system, the plurality of quantum circuits in a manner that optimizes performance of the quantum computer program on the quantum computer.

14. The computer-implemented method of claim 13, wherein the manner facilitates achievement of at least one member selected from a group consisting of: reduction of an average execution time of the quantum computer program, reduction of an estimated error rate that characterizes execution the quantum computer program, and a balancing of a work load of the quantum computer with respect to the plurality of quantum computers.

15. A computer program product for managing execution of a quantum computer program, the computer program product comprising a computer readable storage medium having program instructions embodied therewith, the program instructions executable by a processor to cause the processor to:
adapt, by a system operatively coupled to the processor, a quantum circuit of the quantum computer program comprised within a queue based on a parameter of a quantum computer that is assigned to execute the quantum computer program, wherein the quantum computer program is arranged within the queue based on one or more of a size of the quantum computer program, a type of quantum computer program, a function of the quantum computer program or the origin of the quantum computer program, wherein the program instructions cause the processor to adapt the quantum circuit by re-mapping a connectivity of the quantum circuit based on the parameter of the quantum compute.

16. The computer program product of claim 15, wherein the quantum computer is assigned via a cloud computing environment.

17. The computer program product of claim 15, wherein the program instructions further cause the processor to:
assign, by the system, the quantum computer to execute the quantum computer program from a plurality of quantum computers based on a characteristic of the quantum circuit in addition to the parameter of the quantum computer, wherein the quantum circuit is comprised within a plurality of quantum circuits of the quantum computer program; and
compile, by the system, the plurality of quantum circuits in a manner that optimizes performance of the quantum computer program on the quantum computer.

18. The computer program product of claim 17, wherein the manner optimizes performance of the quantum computer program by reducing an error rate that characterizes execution of the quantum computer program.

* * * * *